US005659795A

United States Patent [19]
Duvall et al.

[11] Patent Number: 5,659,795
[45] Date of Patent: Aug. 19, 1997

[54] SYSTEM AND METHOD FOR CONTROLLING COMPUTER OUTPUT DEVICES BY UTILIZING BOTH THEIR STATIC AND DYNAMIC ATTRIBUTES

[75] Inventors: Keith E. Duvall, Niwot; Ronald L. Heiney, Longmont; Anthony F. Stuart, Jamestown; Claude A. Bugg, Boulder; Gregory S. Felderman, Westminster; Stuart Walker, Boulder, all of Colo.

[73] Assignee: International Business Machines Corporation, Armonk, N.Y.

[21] Appl. No.: 378,413

[22] Filed: Jan. 26, 1995

[51] Int. Cl.⁶ ................................................ G06F 11/00
[52] U.S. Cl. ........................... 395/835; 395/836; 395/839
[58] Field of Search ........................... 358/296; 395/835, 395/836, 837, 838, 839

[56] References Cited

U.S. PATENT DOCUMENTS

| | | | |
|---|---|---|---|
| 4,834,360 | 5/1989 | Acquaviva | 271/3.1 |
| 5,050,098 | 9/1991 | Brown, III et al. | 364/519 |
| 5,095,369 | 3/1992 | Ortiz et al. | 358/296 |
| 5,129,639 | 7/1992 | DeHority | 270/1.1 |
| 5,287,194 | 2/1994 | Lobiondo | 358/296 |

*Primary Examiner*—Jack B. Harvey
*Assistant Examiner*—Jigar Pancholi
*Attorney, Agent, or Firm*—Holland & Hart

[57] ABSTRACT

A system and method for efficiently utilizing the output devices of a computer system to perform output functions. The output devices are capable of bidirectional communication and are capable of generating information pertaining to static and dynamic attributes of the respective output devices. Responsive to the additional information pertaining to the static and dynamic attributes of the output devices, particular ones of the output devices are allocated to effectuate particular ones of the output functions.

13 Claims, 4 Drawing Sheets

SYSTEM AND METHOD FOR CONTROLLING COMPUTER OUTPUT DEVICES BY UTILIZING BOTH THEIR STATIC AND DYNAMIC ATTRIBUTES

BACKGROUND OF THE INVENTION

The present invention relates generally to a computer coupled to output devices capable of bidirectional communications. More particularly, the present invention relates to a system, and an associated method, for facilitating management of the usage of the output devices coupled to a host computer.

The system and method of the present invention utilizes increased amounts of information pertaining to both static and dynamic attributes of the output devices. Responsive to such increased amounts of information, more efficient allocation of the output devices to perform output functions is possible. With knowledge of the increased amounts of information, optimal selection of utilization of particular ones of the output devices to perform particular output functions is possible. For instance, when the output devices include print resources, knowledge of static and dynamic attributes of the print resources permits optimal allocation of the print resources to perform particular print functions.

In many computer systems, such as networked systems, a large number of different output devices are coupled to one or more host computers. When an operator or other end user of a host computer desires to effectuate an output function, the operator or other end user initiates execution of appropriate commands to cause a particular one of the output devices to perform the particular output function. For instance, when a particular print function is to be performed, the operator or other end user selects a particular one of the print resources to perform the print function and initiates execution of the appropriate commands to cause the selected print resource to execute the particular print function.

Oftentimes, only the names of the output devices coupled to the host computer are provided to the operator. In some instances, limited information pertaining to certain dynamic attributes of the output devices are provided to the operator. In the example of a print resource, in some instances, the print status of a print function is made available to the operator or other end user. However, the operator must initiate execution of a print function to be performed by a particular print resource. That is to say, the operator must select the print resource which is to perform the print function.

Many of the output devices which may be coupled to the host computer have conventionally been operable only to receive data and commands generated by a host computer or other device. In such conventional operation, the output devices do not generate information for transmission back to the host computer pertaining to either static or dynamic attributes of the output device. More recently, some output devices have been constructed which permit not only the reception of data and commands transmitted thereto by a host computer, but also which permit the generation of information to be transmitted to another device, such as the host computer. The information generated at the output device can be comprised not only of static attributes of the output device, but also of dynamic attributes of the device.

This additional information can be utilized by the computer operator or other end user to facilitate the management of usage of the output devices. In the example in which the output devices include print resources, both static and dynamic attributes of the print resources can be provided to the host computer. Responsive to such additional information, improved management of the usage of the print resources can be effectuated. Temporarily-based determinations of selection of a particular print resource can be made. For instance, if a particular one of the print resources is being utilized to perform a print function requiring an extended period of time for its completion, information to such effect transmitted to the host computer permits a substitute print resource to be selected to perform the print function. Also, when numerous print functions are to be performed by a plurality of print resources, the information provided by the print resources can be utilized to optimize usage of the plurality of print resources to effectuate the plurality of print functions.

Existing computer systems, however, do not fully utilize the additional information which can be provided by output devices capable of bidirectional communication.

What is needed, therefore, is an improved means for managing operation of computer output devices which utilizes the additional information which can be provided by the output devices.

It is with respect to these considerations and other background information relative to computer systems that the significant improvements of the present invention have evolved.

SUMMARY OF THE INVENTION

It is a first object of the present invention to provide a system, and an associated method, for facilitating management of the usage of output devices capable of bidirectional communication.

It is a second object of the present invention to provide an improved means for managing operation of print resources of a computer system.

The present invention includes further objects and features, the details of which will become more apparent by reading the detailed description hereinbelow.

Because the present invention utilizes increased amounts of information pertaining to the static and dynamic attributes of the output devices of a computer system, management of the usage of the output devices is facilitated. Selection and utilization of particular ones of the output devices to perform particular output functions is performed responsive to the increased amounts of information.

Particular ones of the output devices can be assigned to perform particular output functions to maximize the efficiency, or otherwise optimize, utilization of the output devices. When the output devices include print resources, particular ones of the print resources can be allocated to perform particular print functions responsive to the attributes of the particular print resources and the characteristics of the particular print functions. In many instances, a particular one of the print resources is best able to perform a particular print function. By utilizing the additional information pertaining to the print resources, the print resource best able to perform the print function can be allocated to perform the print function. That is to say, the print resource can be paired with the print function to optimize execution of the print function. Allocation of the print resource to perform the print function can be made without operator intervention by an automated allocation procedure. Or, the additional information can be provided to the operator, and the operator can be prompted to allocate a particular print resource to perform the print function.

Any of many various criteria can be utilized to allocate the print resource to perform the print function. Allocation of a particular print resource to execute the print function can be selected, for example, to maximize the speed at which the printing task is effectuated. Or, the print resource can be selected to ensure that the print resource allocated to perform the print function is located within a selected proximity of the operator initiating the print function. Many other criteria for selecting allocation of a print resource to perform a print function may similarly be utilized.

In accordance with the present invention, therefore, a system and method for managing operation of a set of output devices is disclosed. The set of output devices includes at least one output device. At least one output device is coupled to a processing device having an end user interface and is coupled to a database storage device. At least one output device of the set of output devices is capable of generating signals of values indicative of selected attributes thereof. Values indicative of the selected attributes of the output device are stored in the database storage device. The values are stored responsive to the generation of the signals of the values indicative of the selected attributes of the output device. Selected ones of the values stored in the database storage device are accessed. Responsive to the accessing of the selected ones of the values stored in the database storage device, operation of the output device is managed.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
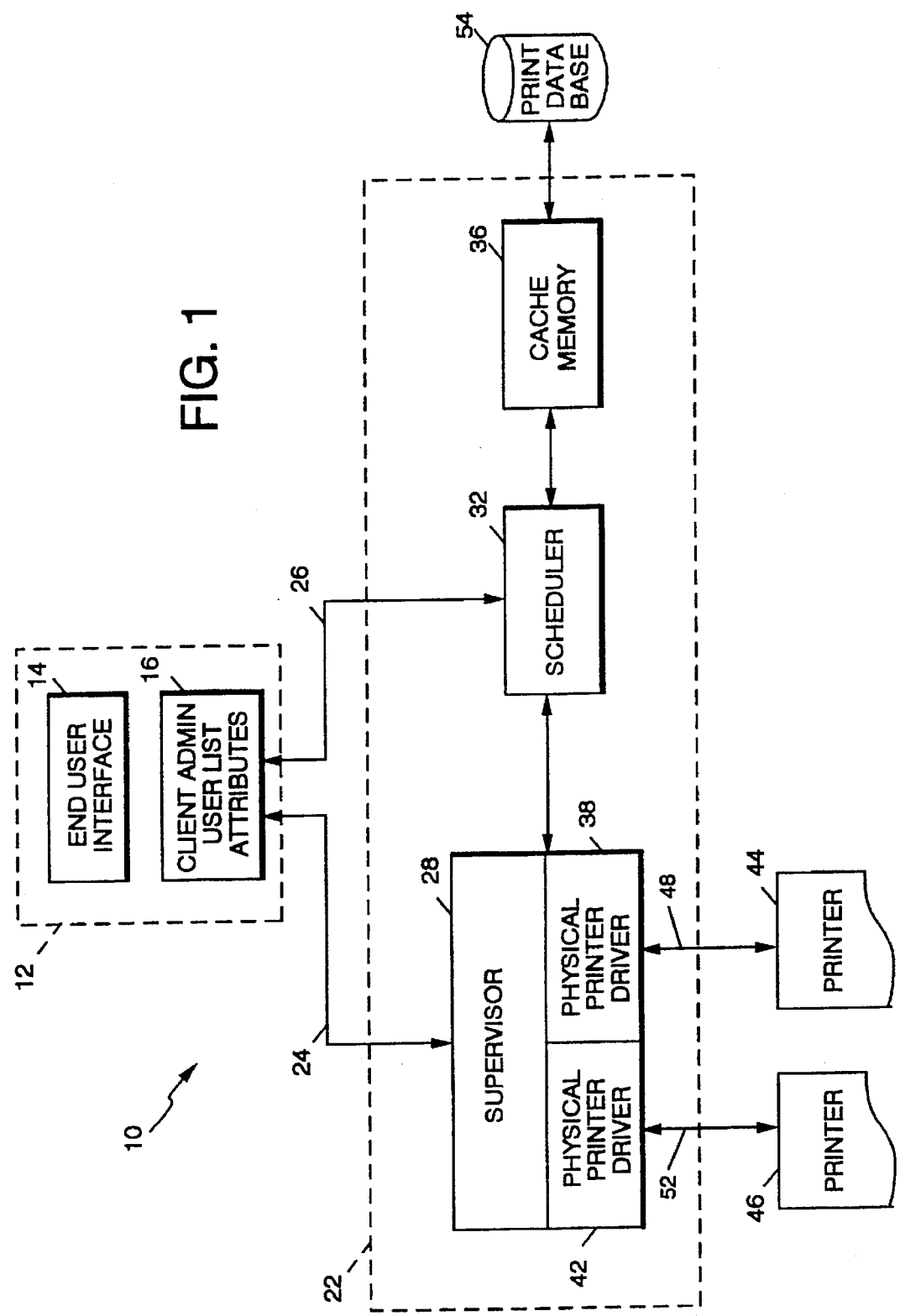
FIG. 1 is a functional block diagram of a computer system including an embodiment of the present invention.

FIG. 1 illustrates a computer system, shown generally at 10, of an embodiment of the present invention. The computer system 10 forms a distributed system and is here shown to include a host computer device 12. The host computer device 12 includes an end user interface 14 and a client administrator element 16. The client administrator element 16 is formed, for example, of a host processor having algorithms executable therein. The host computer device 12 includes any appropriate operating system, such as the Windows™ operating system, operable in conventional manner. An operator or other end user of the host computer device 12 operates the host computer device by way of the end user interface 14. The end user interface 14 may comprise, for example, a keyboard entry system or other interactive entry system, such as a "mouse" operable in conjunction with a video display element. The operator or other end user initiates execution of certain functions to be performed by the computer system 10 by way of entry of appropriate commands through the end user interface 14.

More generally, the end user interface 14 can comprise an applied programming interface coupled to receive signals from other circuitry (not shown) in conventional fashion. The following, exemplary description of operation of the computer system 10 describes operation in terms of an operator or other end user inputting instructions by way of the end user interface. Operation of the computer system can similarly be described in terms of control, or other, circuitry applying instructions to an end user interface formed of an applied programming interface.

The host computer device 12 is coupled in a network connection with a Unix™-based device 22, here indicated by way of lines 24 and 26. The Unix™-based device 22 includes a file server forming a supervisor 28 and a file server forming a scheduler 32. The supervisor 28 and the scheduler 32 are coupled by way of the line 34.

The scheduler 32 includes a cache memory 36. The cache memory 36 is preferably an electronic, or other high-speed, memory device.

It should be noted that, while the embodiment of the computer system 10 shown in FIG. 1 illustrates the host computer device 12, the supervisor 28, and the scheduler 32 to be formed of distributed devices, the computer system 10 may be alternately configured as a single unit or in other manners.

The supervisor 28 is further coupled to print drivers 38 and 42. The print drivers 38 and 42 are coupled to printers 44 and 46, respectively, by the lines 48 and 52. While the printer drivers 38 and 42 are shown in the figure to form physical printer drivers, the printer drivers 38 and 42 can alternately form logical printer drivers, in conventional fashion.

The printers 44 and 46 are both capable of bidirectional communication. That is to say, the printers can both receive print data streams containing data to perform various print functions and can also generate and transmit information pertaining to the attributes of the respective printers 44 and 46.

The computer system 10 further includes a database device 54 for storing data therein. Memory locations of the database 54 are accessible by the scheduler 32. In the embodiment illustrated in the figure, certain of the data stored in the database 54 is also stored in the cache memory 36. The cache memory 36 is updated at selected times with the data stored in the database, thereby permitting the scheduler 32 to access the cache memory 36 in order to increase the speed at which data may be accessed.

An operator or other end user of the host computer device 12 can initiate execution of print functions through appropriate input of input commands through the end user interface 14. The operator or other end user can also initiate inquiries regarding the attributes of the printers 44 and 46, also by input of appropriate commands by way of the end user interface 14. The input commands may be input, for instance, through appropriate actuation of actuation keys of an input keyboard or through appropriate actuation of an electronic "mouse" in conjunction with a video display terminal.

In one embodiment of the present invention, the operator or other end user of the host computer device 12 inputs a "list" command. A string of parameters further defining the "list" command can be concatenated to the command, or default values can be concatenated to the command.

Responsive to the generation of the "list" command, the host computer device 12 generates signals representative of the command and transmits such signals to the supervisor 28. When the supervisor 28 receives the signals generated by the host computer device 12, the supervisor communicates with an appropriate one of the print drivers 38 or 42. The appropriate print driver generates an inquiry which is transmitted to the printer 44 or 46 coupled thereto. In one embodiment of the present invention, the print driver 38 or 42 generates an XOHOPC (execute order home state, obtain printer character) command, a standard IPDS command. IPDS, the Intelligent Printer Data Stream, is an IBM proprietary data stream accommodated by many printers, chiefly those available from International Business Machines Corporation.

Responsive to the inquiry, the printer generates signals of values representative of the attributes of the printer. The signals are transmitted back to the print driver and, in turn, to the supervisor 28 and thereafter to the host computer device 12, thereby to provide the host computer device with information pertaining to the printer.

The scheduler 32 is further operative to cause values of the signals generated by the print resources, here printers 44 and 46, to be stored in memory locations of the database 54. The signals generated by the print resources are of values representative of the attributes of the print resources, and storage of the values of the signals generated by the print resources causes the attributes of the print resources of the system 10 to be stored at a common storage location. Values of the signals representative of the attributes of the print resources of the computer system 10 are stored at selected times in the data base 54 to update the database with information pertaining to the attributes of the print resources. Signals generated by the printers 44 and 46 of the computer system 10 on the lines 48 and 52 are received by the print drivers 38 and 42. The print drivers 38 and 42 in turn generate signals of values representative of the signals received thereat and apply the signals to the supervisor 28. The supervisor 28 generates signals on the lines 34 of values representative of the attributes of the printers 44 and 46 and supply the values to the scheduler 32 which, in turn, causes values representative of the attributes to be stored in the database 54.

The operator or other end user of the host computer device 12 can also initiate execution of a print function. The operator or other end user initiates execution of a print function by appropriate input of a print command by way of the end user interface 14. Entry of the print command causes generation of a job request. The job request is interpreted at the host computer device 12 and, responsive to the entered print command, signals are generated on the lines 26 and received by the scheduler 32.

When the scheduler 32 receives signals on the line 26, the scheduler accesses memory locations of the cache memory 36 to determine the static and dynamic attributes of the print resources of the computer system 10. Alternately, the scheduler 32 accesses the memory locations of the database 54 whereat information pertaining to the attributes of the print resources are also stored.

The scheduler 32 determines the allocation of a particular print resource of the computer system 10 to perform the print function defined by the job request responsive to the attributes of the various print resources and also the characteristics of the print function to be effectuated. By pairing the print function with a particular print resource according to a desired allocation procedure, the print resources of the computer system 10 can be optimally utilized to most efficiently perform print functions.

Once the scheduler 32 allocates a particular print resource to perform the print function, the scheduler generates signals on the line 34 which interconnect the scheduler 32 and the supervisor 28. Once the supervisor 28 receives the signals generated by the scheduler 32, the supervisor generates signals for application to the print driver 38 or 42 associated with the allocated print resource, here either printer 44 or printer 46, which is allocated to execute the print function.

Figure 2:
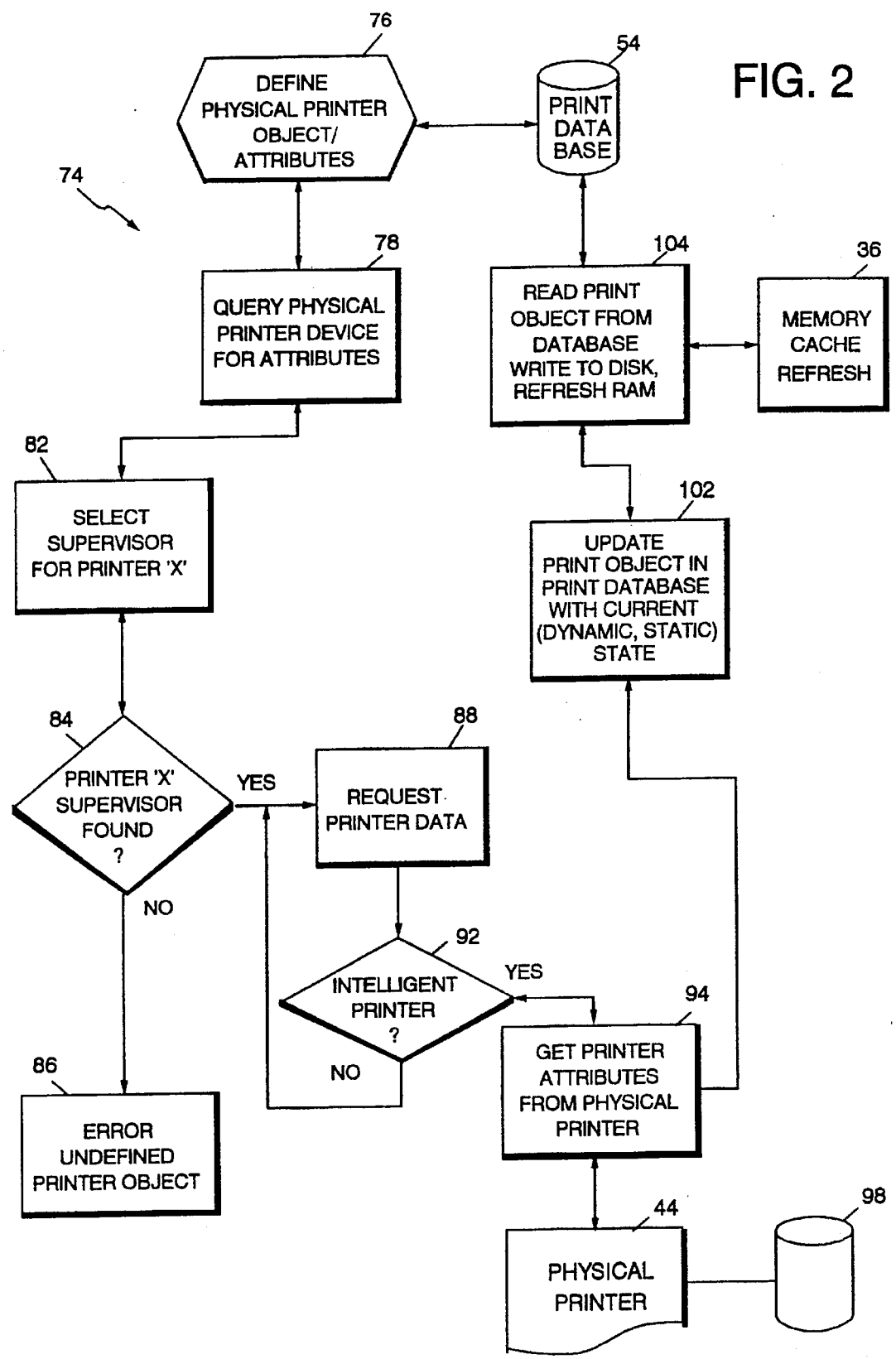
FIG. 2 is a partial functional block, partial logical flow diagram which illustrates operation of the computer system shown in FIG. 1 to obtain information pertaining to attributes of printers forming output devices and for storing the information, once obtained, in an informational database.

FIG. 2 illustrates a method shown generally at 74, which illustrates operation of the computer system 10 shown in FIG. 1 to store data pertaining to the attributes of the print resources of the computer system in an informational database. First, and as indicated by the logical operation 76, physical printer attributes in objects are defined. Next, and as indicated by logical operation 78, a physical printer device is queried to determine the attributes of the device. Then, and as indicated by the operation 82, a supervisor associated with the selected printer device is selected.

A determination is then made at the step 84 as to whether the supervisor associated with the selected printer is found. If not, the no branch is taken to the logical operation 86 and an error message is generated indicating that an undefined printer object has been entered. If conversely, the supervisor is found, the yes branch is taken from the decision operation 84 to the step 88. At the step 88, printer data associated with the attributes of the selected printer is requested. Then, at the logical operation 92, a determination is made as to whether the printer is capable of bidirectional communications. If not, the no branch is taken; conversely, if the selected printer is capable of bidirectional communications, the yes branch is taken to the step 94.

At step 94, the attributes of the selected printer are obtained, either in the manner described with respect to FIG. 3 below or by an automated process, here indicated, for purposes of example, by the printer 44 shown previously in FIG. 1 and a storage element 98 positioned together with the printer 44.

Once the attributes of the printer have been obtained, the data stored in the printer database, here the database 54 shown in FIG. 1, is updated, as indicated by the logical operation 102. The database 54 is updated with the newly-obtained information pertaining to the static and dynamic attributes of the selected printer.

Then, as indicated by the step 104, the data stored in the printer database is written to a disk and the cache memory, here the cache memory 38 shown previously in FIG. 1, is refreshed.

Figure 3:
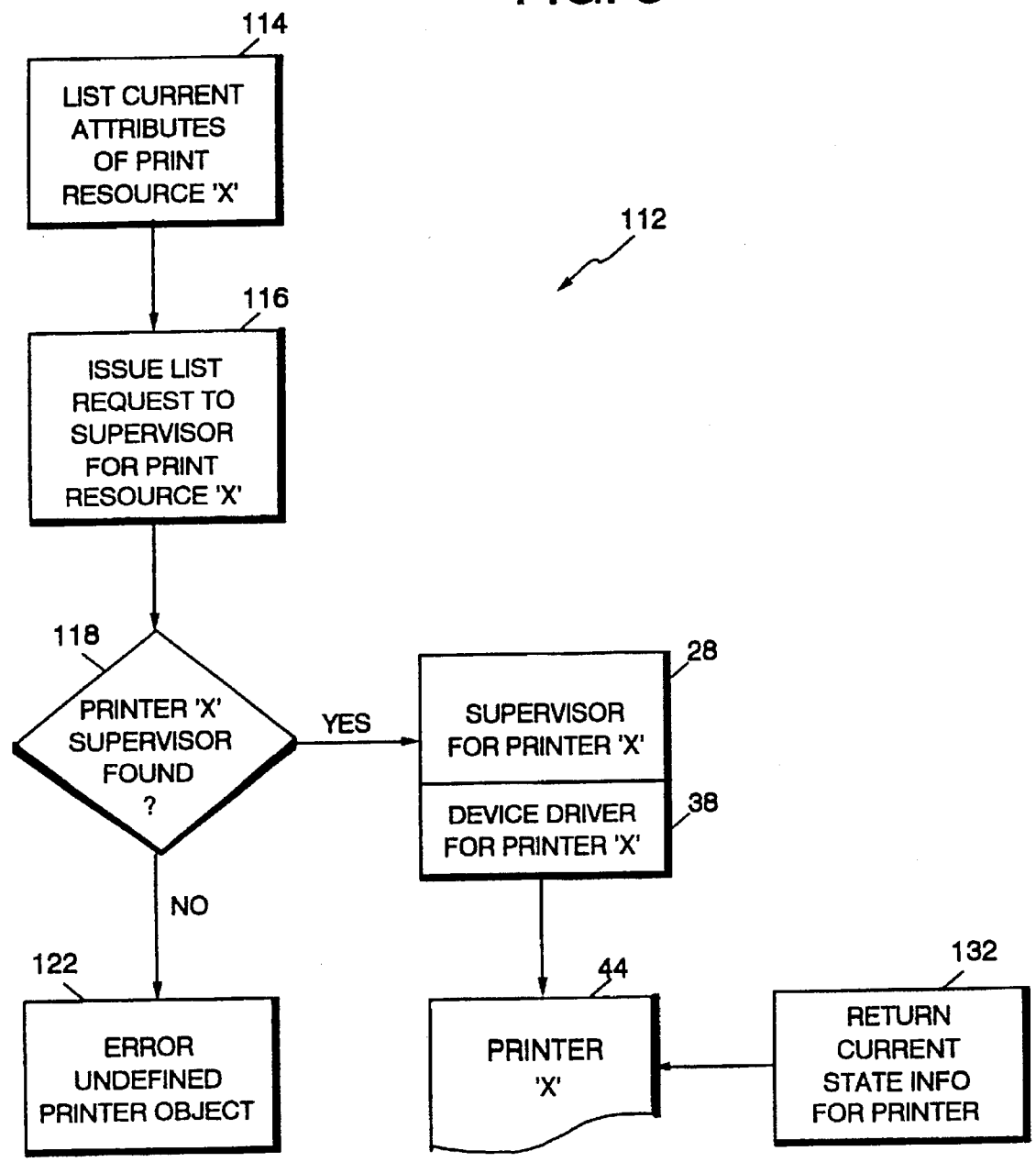
FIG. 3 is a partial functional block, partial logical flow diagram which illustrates operation of the computer system shown in FIG. 1 to update the information pertaining to a printer as an output device whose information is stored in the informational database.

FIG. 3 is an illustration of another method for obtaining current attribute or dynamic information, here shown generally at 112. The method 112 illustrates the manner by which an operator or other end user of the computer system 10 shown in FIG. 1 can obtain up-to-date information pertaining to the attributes of a selected print resource of the computer system.

First, and as indicated by the step 114, the operator or other end user inputs a command to list the current attributes of a selected print resource (i.e., the operator enters the aforementioned "list" command). As mentioned previously, the operator or other end user inputs the command by way of the end user interface 14 of the host computer device 12.

Then, and as indicated by the logical operation 116, a list request is issued to a supervisor of the selected print resource. In the computer system 10 shown in FIG. 1, the client administrator element 16 generates signals forming the list request on line 24 for transmission to the supervisor 28.

Once the list request is issued to the supervisor, a determination is made, as indicated by the logical operation 118, as to whether the supervisor associated with the selected print resource can be located. If not, the no branch is taken, and an error message is generated, as indicated by the step 122. The error indicates that an undefined printer object is selected.

If, conversely, the supervisor is located, the yes branch is taken from the logical operation 118 to a supervisor, here the supervisor 28 shown previously in FIG. 1. A device driver, here for purposes of example, the device driver 38 associated with the printer 44 shown in FIG. 1, is shown to be coupled to the supervisor 28. The device driver 38 queries the selected printer, here the printer 44 to determine the attributes and status of the printer. The current attribute and status information pertaining to the selected printer is transmitted back to the device driver, here indicated by the block 132.

Figure 4:
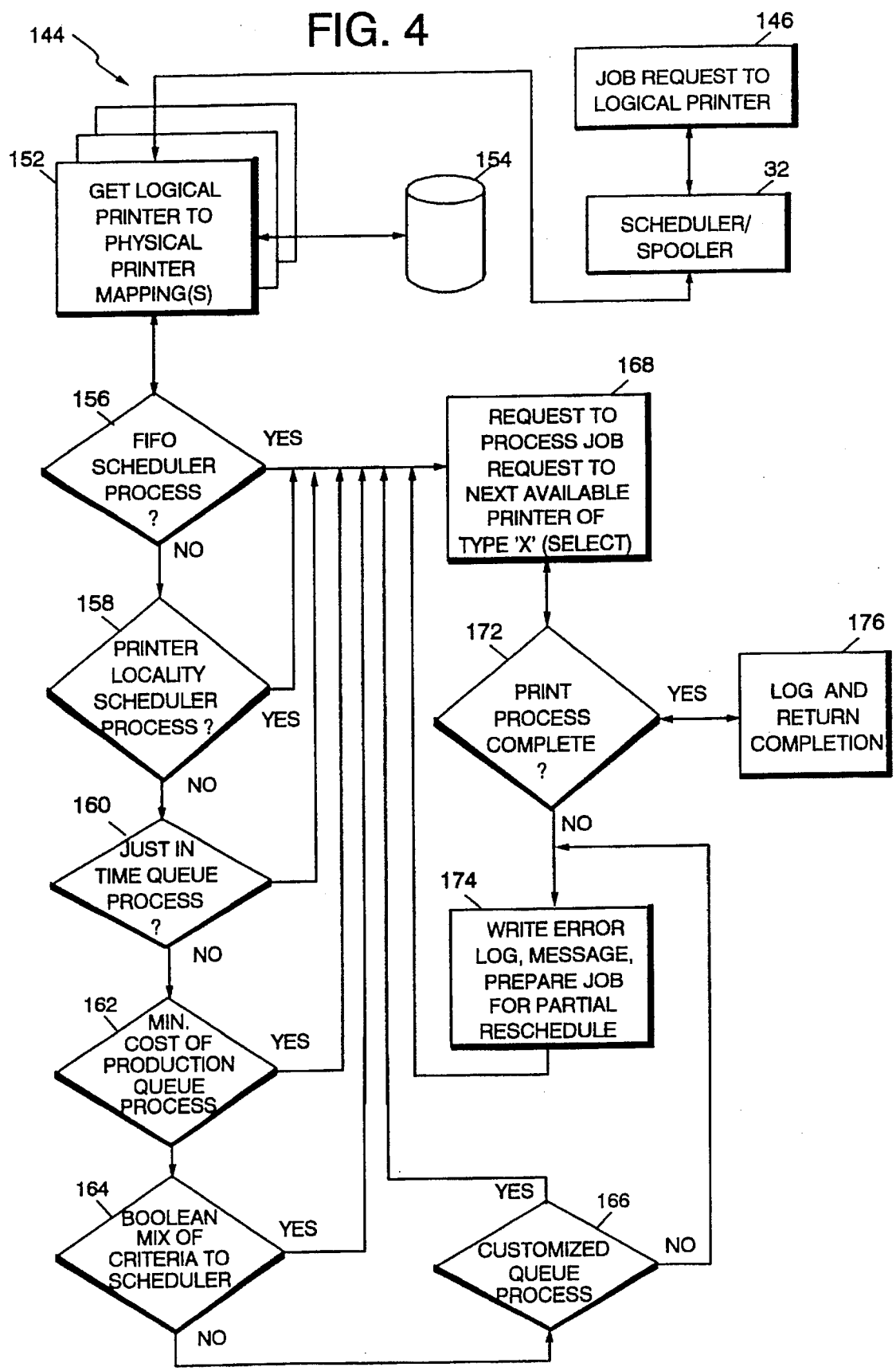
FIG. 4 is an exemplary, partial functional block, partial logical flow diagram which illustrates operation of the computer system shown in FIG. 1 to optimize scheduling of print functions during operation of an embodiment of the present invention.

FIG. 4 illustrates a method, shown generally at 144, which illustrates print resource allocation of an embodiment of the present invention. That is to say, the method allocates a print resource to execute a print function identified by a job request.

First, and as indicated by the step 146, a job request entered by an operator or other end user of the computer system is issued to a logical printer. The request is transmitted to a scheduler/spooler, here the scheduler 32 shown previously in FIG. 1.

Next, and as indicated by the step 152, logical printer to physical printer mappings are obtained. The mappings are obtained by accessing a database, here represented by the database 154. Next, and as indicated by the cascaded steps 156, 158, 160, 162, 164, and 166, a plurality of determinations are made pertaining to the criteria used to select the print resource to be allocated to the print function. The steps 156–166 indicate various, exemplary criteria by which a particular print resource is allocated to execute the print function defined by the job request. Other criteria for allocating a particular print resource to execute the print function can alternatively be utilized.

In the method illustrated in FIG. 3, determinations are made as to whether the print functions should be scheduled by a first in, first out process 156, by a physical locality scheduling process 158, by a just-in-time queue process 160, by a minimal cost of production queue process 162, by a boolean mix of criteria process 164, or by a customized queue process 166. For purposes of illustration, yes branches taken for any of the logical operations 156–166 extend to the logical operation 168. At the operation 168, the print function defined by the job request is enquequed to the next available printer which meet the selected criteria.

In one embodiment, determination of selection of the print resource (or other output device) to execute a print function (or other output function) is temporally-based when selection must be made among print resources having similar or common capabilities. Dynamic attribute characteristics, or changes in the dynamic attribute characteristics, weight the selection of a particular resource at a particular time t. Time-based selection of the print resource to perform the same print function at another time, time x, might result in selection of a different print resource as the dynamic attribute characteristics of the print resources at time x might differ with the characteristics at time t. In any event, determination of the print resource selection is based upon the physical device characteristics, i.e., static and dynamic attributes, of all of the managed devices of a system to effectuate automated load balancing of output functions to be effectuated by the system.

Then, and as indicated by the step 172, a determination is made as to whether the print process is complete. If not, the no branch is taken to the logical operation 174, an error log message is written, and the print function is prepared for partial rescheduling.

If, conversely, the print process is complete, the yes branch is taken from the step 172 and the completion of the print process is logged, as indicated by the logical operation 176.

Because the computer system 10 utilizes increased amounts of information pertaining to the static and dynamic attributes of the printers 44 and 46, management of the usage of the printers is facilitated. Selection of utilization of a particular one of the printers to execute particular print functions is selected responsive to knowledge of the increased amounts of information. Through appropriate utilization of the printers, the printer best able to perform a particular print function can be allocated to perform the print function. Execution of print functions can thereby be optimized.

Presently-preferred embodiments of the present invention have been described with a degree of particularity. The previous descriptions are of preferred examples for implementing the invention, and the scope of the invention should not necessary be limited by this description. The scope of the present invention is defined by the following claims.

What is claimed is:

1. A method for managing operation of a set of bidirectional output devices coupled to a processing device having an end user interface and to a database storage device, the set of output devices adapted to receive command signals for performing predetermined operations and to generate signals indicative of the condition of selected attributes thereof, said method comprising the steps of:

a) querying the output devices through the processing device to receive therefrom signals indicative of the current status of their selected static and dynamic attributes;

b) storing the value of each of the signals indicative of the selected attributes of the output devices in the database storage device each time the output devices are queried;

c) accessing selected ones of the signal values stored during said step of storing; and d) managing operation of the set of output devices in response to the current static and dynamic attributes thereof.

2. The method of claim 1 wherein said querying step further comprises periodically querying the set of output devices to determine signals indicative of the current status of their selected static and dynamic attributes.

3. The method of claim 1 wherein the set of output devices comprise a plurality of print resources and said step of managing operation comprises allocating utilization of the print resources to effectuate print jobs in accordance with the current status of the selected static and dynamic attributes of the output devices.

4. The method of claim 3 wherein said step of allocating the utilization of the print resources is dependent in part upon the input entered by way of the end user interface.

5. The method of claim 3 wherein said step of allocating the utilization of the print resources is dependent in part upon the print jobs to be effectuated by the print resources.

6. The method of claim 3 wherein allocation of the print resources to effectuate the print jobs optimizes the utilization of the print resources according to a selected criteria.

7. The method of claim 3 wherein said step of managing the operation of the selected print resources further comprises the step of providing selected ones of the signals indicative of the static and dynamic attributes of the print resources to the end user interface in human perceptible form.

8. The method of claim 1 wherein said step of querying the output devices occurs in response to an input entered by way of the end user interface.

9. The method of claim 8 wherein said step of managing the operation of the selected output devices comprises the step of providing the selected ones of the values accessed during said step of accessing to the end user interface in human perceptible form.

10. In a computer-controlled system having a host computer, an end user interface, and a set of bidirectional output devices, each output device adapted to receive command signals for performing predetermined operations and to generate signals indicative of the condition of selected static and dynamic attributes thereof, a combination with the host computer and end user interface of an apparatus for managing operation of the set of output devices, said apparatus comprising:

a) querying means for requesting signals indicative of the current status of all selected static and dynamic attributes of the output devices therefrom;

b) storage means for storing the values of the signals indicative of the current status of all selected static and dynamic attributes of each output device therein each time the output devices are queried;

c) accessing means for accessing selected ones of the values stored in said storage means responsive to an input request therefor entered by way of the end user interface; and d) circuit means responsive to the current status of all selected static and dynamic attributes of each output device for managing the operation of the set of output devices in response to the current attributes thereof.

11. The apparatus of claim 10 wherein said querying means are adapted to periodically query the values of the signals indicative of at least the dynamic attributes of each output device and said storage means stores the signals resulting from each periodic query therein.

12. The apparatus of claim 10 whereto said accessing means includes a first computer server coupled to the end user interface and to said storage means, said first computer server being adapted to receive the input entered through the end user interface and to initiate access to the values stored in said storage means.

13. The apparatus of claim 12 wherein said circuit means comprises a second computer server forming a scheduler responsively coupled to said first computer server.

* * * * *